United States Patent [19]

Miranti, Jr. et al.

[11] 4,410,314
[45] Oct. 18, 1983

[54] ENDLESS POWER TRANSMISSION V-BELT CONSTRUCTION AND METHOD OF MAKING THE SAME

[75] Inventors: Joseph P. Miranti, Jr., Porter Township, Christian County; Mark P. Foley, Springfield; Gerald C. Hollaway, Springfield; Larry R. Oliver, Springfield; Paul M. Standley, Springfield; James A. Lewis, Springfield, all of Mo.

[73] Assignee: Dayco Corporation, Dayton, Ohio

[21] Appl. No.: 348,106

[22] Filed: Feb. 11, 1982

[51] Int. Cl.³ .......................... F16G 1/00; F16G 5/00
[52] U.S. Cl. .................................................. 474/251
[58] Field of Search ............... 474/205, 249, 250, 251, 474/263; 156/138, 139

[56] References Cited

U.S. PATENT DOCUMENTS

| | | | |
|---|---|---|---|
| 1,890,080 | 12/1932 | Freedlander | 474/251 |
| 3,988,941 | 11/1976 | Smith | 474/251 |
| 4,131,030 | 11/1978 | White, Jr. | 156/139 X |
| 4,137,787 | 2/1979 | Waugh | 156/139 X |
| 4,228,692 | 10/1980 | Jacob et al. | 156/139 X |

Primary Examiner—Lawrence J. Staab
Assistant Examiner—Michael D. Bednarek
Attorney, Agent, or Firm—Joseph V. Tassone

[57] ABSTRACT

An endless power transmission V-belt construction and method of making the same are provided, the belt construction being formed mainly of polymeric material and having rounded top and bottom teeth respectively extending along the length of the top and bottom surfaces of the belt construction, the belt construction comprising a tension section having the top surface, a compression section having the bottom surface, and a load-carrying section disposed intermediate the tension section and the compression section. The quotient of the bottom to top tooth pitch ratio of the belt construction is approximately 1.40 and the quotient of the bottom to top tooth depth ratio thereof is approximately 1.77 while the quotient of the belt thickness to flex thickness ratio thereof is approximately 3.98.

22 Claims, 3 Drawing Figures

ENDLESS POWER TRANSMISSION V-BELT CONSTRUCTION AND METHOD OF MAKING THE SAME

BACKGROUND OF THE INVENTION

1. Field of the Invention

This invention relates to an improved endless power transmission V-belt construction as well as to a method of making such a belt construction.

2. Prior Art Statement

It is known in the art to provide an endless power transmission V-belt construction formed mainly of polymeric material and having rounded top and bottom teeth respectively extending along the length of the top and bottom surfaces of the belt construction, the belt construction comprising a tension section having the top surface, a compression section having the bottom surface, and a load-carrying section disposed intermediate the tension section and the compression section.

For example, see the following two United States Patents:

(1) U.S. Pat. No. 1,890,080—Freedlander
(2) U.S. Pat. No. 3,988,941—Smith

It appears that the endless power transmission V-belts of items (1) and (2) above each has the top and bottom rounded teeth thereof formed of substantially the same cross-sectional configuration.

SUMMARY OF THE INVENTION

It is one feature of this invention to provide an improved endless power transmission V-belt construction that is particularly adapted for continuously variable transmission use for transportation vehicles or the like.

In particular, it is well known that continuously variable transmission V-belt constructions are each ordinarily constructed with a large aspect ratio (ratio of top width to thickness), usually the quotient of such ratio being between 2.0 and 4.0, in order to provide the greatest possible speed ratio. The top width of the belt construction is determined by the speed ratio and the tension required to transmit power, while the thickness is determined by the need for crosswise support and constrained by the minimum diameter required by the speed ratio and the required tension. These considerations are especially critical in transportation vehicle drives which are characterized by short belt lengths which allow insufficient cooling of the belt constructions on each revolution thereof. Accordingly, the belt construction must be thick enough to prevent inward collapse or excessive crosswise flex (dishing) and yet thin enough to flex over the minimum diameter required by the drive.

V-belt constructions are commonly toothed, notched or corrugated to provide the required flexibility while maintaining enough thickness for crosswise support. Teeth also increase heat transfer rate by increasing surface area and air flow around the belt, round teeth providing the shortest heat flow path to the outside of the belt construction from the center of each tooth. In certain belt construction applications, greater thickness is required to prevent collapse than can be achieved with a single tooth construction and therefore in such cases, the V-belt constructions are toothed both on the tops and bottoms thereof.

Therefore, it was found according to the teachings of this invention that a V-belt construction of the double rounded tooth type allows the maximum total belt construction thickness to be used for maximum crosswise support while providing the minimum "flex thickness" (root plane of top tooth to root plane of bottom tooth) and thereof could be utilized for continuously variable transmission purposes.

In particular, one embodiment of this invention provides an endless power transmission V-belt construction formed mainly of polymeric material and having rounded top and bottom teeth respectively extending along the length of the top and bottom surfaces of the belt construction, the belt construction comprising a tension section having the top surface, a compression section having the bottom surface, and a load-carrying section disposed intermediate the tension section and the compression section. The quotient of the bottom to top tooth pitch of the belt construction is approximately 1.40 and the quotient of the bottom to top tooth depth thereof is approximately 1.77 while the quotient of the belt thickness to flex thickness is approximately 3.98.

Accordingly, it is an object of this invention to provide an improved endless power transmission V-belt construction having one or more of the novel features of this invention as set forth above or hereinafter shown or described.

Another object of this invention is to provide a method of making such an endless power transmission V-belt construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
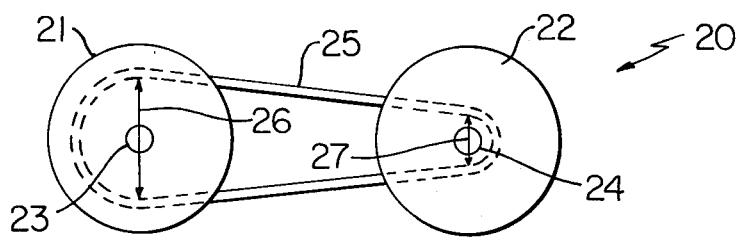
FIG. 1 is a schematic side view illustrating a typical continuously variable transmission unit.

While the various features of this invention are hereinafter illustrated and described as being particularly adapted to provide an endless power transmission V-belt construction for continuously variable transmission purposes, it is to be understood that the various features of this invention can be utilized singly or in various combinations thereof to provide belt constructions for other purposes.

Therefore, this invention is not to be limited to only the embodiment illustrated in the drawings, because the drawings are merely utilized to illustrate one of the wide variety of uses of this invention.

Referring now to FIG. 1, a typical continuously variable transmission unit for a transportation vehicle or the like is generally indicated by the reference numeral 20 and comprises a pair of adjustable sheave drive and driven pulleys 21 and 22 being respectively rotatably mounted by drive and driven shafts 23 and 24 having an endless power transmission V-belt construction 25 drivenly and drivingly disposed around the pulleys 21 and 22 which respectively can have the sheaves thereof adjusted in a manner well known in the art to have the belt construction 25 be looped between maximum and minimum diameters as respectively represented by the arrows 26 and 27 in FIG. 1 in order to provide a continuously variable drive in a manner well known in the art.

As previously stated in order for the unit 20 to provide the greatest possible speed ratio, the V-belt construction 25 is ordinarily constructed with a large aspect ratio (ratio of top width to thickness), such as where the quotient of such ratio is between 2.0 and 4.0.

Such an endless power transmission V-belt construction is provided by this invention and is generally indicated by the reference numeral 28 in FIGS. 2 and 3 and will now be described.

Figure 2:
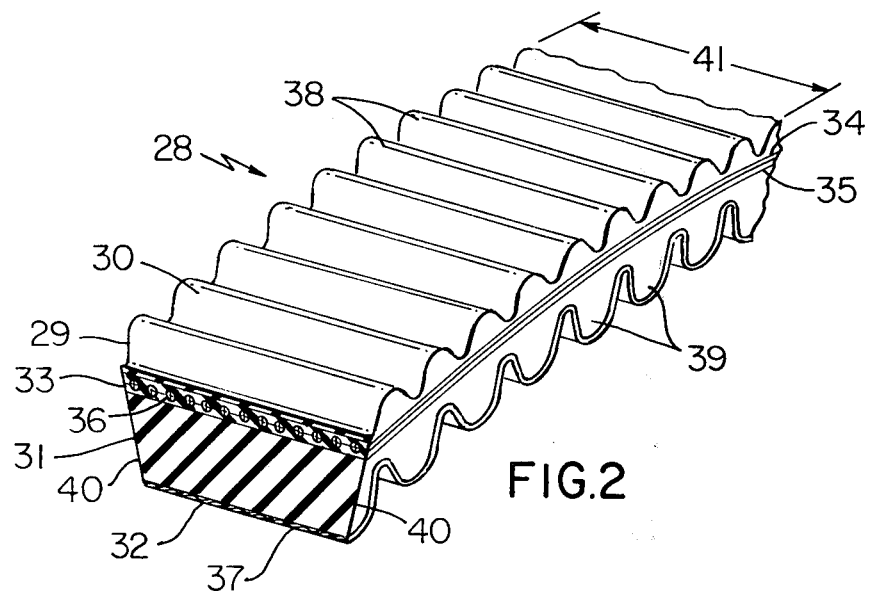
FIG. 2 is a fragmentary perspective view, partially in cross section, of the improved endless power transmission V-belt construction of this invention.
Figure 3:
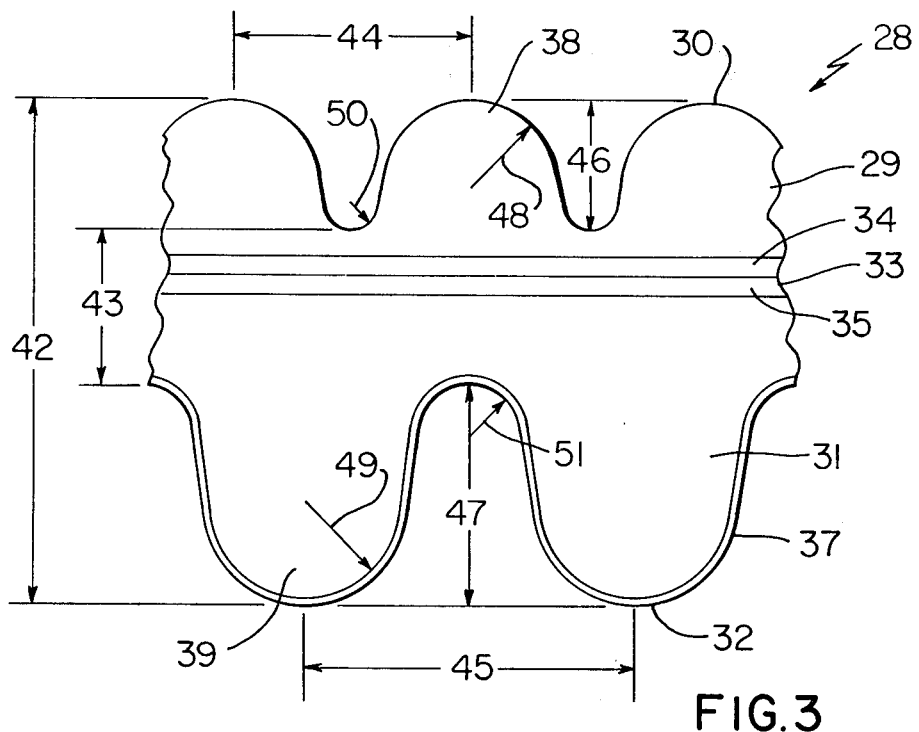
FIG. 3 is an enlarged fragmentary side view of the belt construction of FIG. 2.

As illustrated in FIGS. 2 and 3, the endless power transmission V-belt construction 28 of this invention comprises a tension section 29 that defines a top surface 30 of the belt construction 28, a compression section 31 that defines a bottom surface 32 of the belt construction 28, and a load-carrying or neutral axis section 33 disposed intermediate the tension section 29 and the compression section 31 in a conventional manner, the load-carrying section 33 comprising a top cushion or layer 34 and a bottom cushion or layer 35 with a load-carrying cord 36 helically wound therebetween in a manner well known in the belt construction art.

The belt sections 28, 31 and 33 and cord 36 are formed mainly of polymeric material, and, if desired, at least one of the tension section 29 and the compression section 31 can be fiber loaded (not shown) in a manner well known in the art. Also, if desired, one or more fabric layers, such as fabric layer 37 in FIGS. 2 and 3, can be disposed on at least one of the top and bottom surfaces 30 and 32 in a manner well known in the art.

While any suitable polymeric material can be utilized for the sections 29, 31 and 33, the same can comprise mainly neoprene with conventional fillers and binders as is conventional in the belt art.

The tension section 29 of the belt construction 28 is formed with a plurality of rounded teeth 38 that extend substantially transverse to the longitudinal axis of the belt construction 28 and are substantially uniform to each other while extending along the entire length of the top surface 30 thereof as illustrated, the teeth 38 sometimes being referred to as cogs.

Similarly, the compression section 31 of the belt construction 28 has a plurality of bottom teeth 39 formed therein that extend substantially transverse to the longitudinal axis to the belt construction 28, are substantially uniform to each other and extend along the entire length of the bottom surface 32 of the belt construction 28 as illustrated, the teeth 39 also sometimes being referred to as cogs.

While the belt construction 28 of this invention can be made in any manner known in the art for producing double toothed belts or as sometimes referred to as double cogged belts, such as by forming the bottom teeth as set forth in U.S. Pat. No. 1,611,829; 3,464,875 or 4,106,966 (which three U.S. patents are being incorporated into this disclosure by this reference thereto) and by forming the top teeth as set forth in U.S. Pat. No. 4,106,966; by using a preformed top teethed pad or by using a toothed matrix with a collapsible curing jacket, whereby the resulting belt construction 28 has opposed uncovered driving side edges 40, such as cut side edges or plate finished side edges, that cooperate with the top and bottom surfaces 30 and 32 to define the conventional trapezoidal cross-sectional configuration as illustrated in FIG. 2, the belt construction 28 of this invention is formed so that the quotient of the aspect ratio thereof, as defined by the top width of the belt construction 28 that is indicated by the reference numeral 41 in FIG. 2 and by the belt thickness that is indicated by the reference numeral 42 in FIG. 3, is between 2.0 and 4.0 in order to provide a variable speed V-belt construction.

In particular, it was found according to the teachings of this invention that when the top width 41 of the belt construction 28 is approximately 1 and ⅝ inches with the belt thickness being approximately 0.750 of an inch, the top and bottom teeth 38 and 39 should have the following pitch, tooth depth, tooth tip radii and root radii when considering a substantially straight section thereof and the following flex thickness in order to comprise the unique endless power transmission V-belt construction of this invention wherein the quotient of the bottom to top tooth pitch is approximately 1.40, the quotient of the bottom to top tooth depth is approximately 1.77 and the quotient of the belt thickness to flex thickness is approximately 3.98.

For example, the flex thickness of the particular belt construction 28 of this invention is represented by the reference numeral 43 in FIG. 3 and is approximately 0.188 of an inch.

The pitch of the top teeth 38 of the belt construction 28 of this invention is represented by the reference numeral 44 in FIG. 3 and is approximately 0.3908 of an inch while the pitch of the bottom teeth 39 is represented by the reference numeral 45 in FIG. 3 and is approximately 0.547 of an inch.

The root depth of the top teeth 38 of the belt construction 28 of this invention is represented by the reference numeral 46 in FIG. 3 and is approximately 0.203 of an inch while the root depth of the bottom teeth 39 is represented by the reference numeral 47 in FIG. 3 and is approximately 0.359 of an inch.

The radius for defining the rounded tips of the top teeth 38 of the belt construction 28 of this invention is represented by radius arrow 48 in FIG. 3 and is approximately 0.141 of an inch while the tooth tip radius of the bottom teeth 39 is represented by the radius arrow 49 in FIG. 3 and is approximately 0.156 of an inch.

The root radius of the top teeth 38 of the belt construction 28 of this invention is indicated by the radius arrow 50 in FIG. 3 and is approximately 0.047 of an inch while the root radius of the bottom teeth 39 is indicated by the radius arrow 51 in FIG. 3 and is approximately 0.078 of an inch.

While such a belt construction 28 of this invention can have any suitable length, it has been found that certain continuously variable transmission units 20 for transportation vehicles require belt lengths from approximately 30 inches to approximately 65 inches and require the belt to conform to minimum and maximum diameters 27 and 26 of approximately 3 inches and 9 inches.

It has been found that the belt construction 28 of this invention with the dimensions previously set forth is suitable for such continuously variable transmission units 20.

Therefore, it can be seen that it is a relatively simple method of this invention to form the belt construction 28 by conventional methods to have the top and bottom teeth 38 and 39 thereof so arranged in relation to the belt thickness 42 and flex thickness 43 to provide a bottom to top tooth pitch quotient of approximately 1.40, a bottom to top tooth depth quotient of approximately 1.77, a belt thickness to flex thickness quotient of approximately 3.98 and an aspect quotient of approximately 2.16.

Accordingly, it can be seen that this invention not only provides an improved endless power transmission V-belt construction, but also this invention provides an improved method of making such a belt construction.

While the form and method of this invention now preferred have been illustrated and described as required by the Patent Statute, it is to be understood that other forms and method steps can be utilized and still fall within the scope of the appended claims.

What is claimed is:

1. In an endless power transmission V-belt construction formed mainly of polymeric material and having rounded top and bottom teeth respectively extending along the length of the top and bottom surfaces of said belt construction, said belt construction comprising a tension section having said top surface, a compression section having said bottom surface, and a load-carrying section disposed intermediate said tension section and said compression section, the improvement wherein the quotient of the bottom to top tooth pitch is approximately 1.40, the quotient of the bottom to top tooth depth is approximately 1.77 and the quotient of the belt thickness to flex thickness is approximately 3.98.

2. A belt construction as set forth in claim 1 wherein the quotient range of the top width to belt thickness is approximately 2–4.

3. A belt construction as set forth in claim 1 wherein said belt thickness is approximately 0.750 of an inch and said flex thickness is approximately 0.188 of an inch.

4. A belt construction as set forth in claim 3 wherein the pitch of said top teeth is approximately 0.3908 of an inch and the pitch of said bottom teeth is approximately 0.547 of an inch.

5. A belt construction as set forth in claim 4 wherein the tooth depth of said top teeth is approximately 0.203 of an inch and the tooth depth of said bottom teeth is approximately 0.359 of an inch.

6. A belt construction as set forth in claim 5 wherein each top tooth has a tooth tip radius of approximately 0.141 of an inch and each bottom tooth has a tooth tip radius of approximately 0.156 of an inch.

7. A belt construction as set forth in claim 6 wherein the roots of said top teeth each has a radius of approximately 0.047 of an inch and the roots of said bottom teeth each has a radius of approximately 0.078 of an inch.

8. A belt construction as set forth in claim 7 wherein the top width of said belt construction is approximately 1.625 inches.

9. A belt construction as set forth in claim 1 wherein at least one of said tension section and said compression section has reinforcing fiber means therein.

10. A belt construction as set forth in claim 1 and including at least one layer of fabric means on at least one of said top surface and said bottom surface.

11. A belt construction as set forth in claim 7 wherein said belt construction is to be utilized for a continuously variable transmission unit such as for a transportation vehicle or the like wherein said belt construction must conform to minimum and maximum diameters of approximately 3 inches and approximately 9 inches respectively, said belt construction having a length selected from a range of approximately 30 inches to approximately 65 inches.

12. In a method of making an endless power transmission V-belt construction formed mainly of polymeric material and having rounded top and bottom teeth respectively extending along the length of the top and bottom surfaces of said belt construction, said method comprising the steps of providing a tension section having said top surface, providing a compression section having said bottom surface, and disposing a load-carrying section intermediate said tension section and said compression section, the improvement comprising the step of forming said teeth so that the quotient of the bottom to top tooth pitch is approximately 1.40, the quotient of the bottom to top tooth depth is approximately 1.77 and the quotient of the belt thickness to flex thickness is approximately 3.98.

13. A method of making a belt construction as set forth in claim 12 and including the step of forming the belt construction so that the quotient range of the top width to belt thickness is approximately 2–4.

14. A method of making a belt construction as set forth in claim 12 and including the step of forming said belt thickness to be approximately 0.750 of an inch and said flex thickness to be approximately 0.188 of an inch.

15. A method of making a belt construction as set forth in claim 14 and including the step of forming the pitch of said top teeth to be approximately 0.3908 of an inch and the pitch of said bottom teeth to be approximately 0.547 of an inch.

16. A method of making a belt construction as set forth in claim 15 and including the step of forming the tooth depth of said top teeth to be approximately 0.203 of an inch and the tooth depth of said bottom teeth to be approximately 0.359 of an inch.

17. A method of making a belt construction as set forth in claim 16 and including the step of forming each top tooth to have a tooth tip radius of approximately 0.141 of an inch and each bottom tooth to have a tooth tip radius of approximately 0.156 of an inch.

18. A method of making a belt construction as set forth in claim 17 and including the step of forming the roots of said top teeth to each have a radius of approximately 0.047 of an inch and the roots of said bottom teeth to each have a radius of approximately 0.078 of an inch.

19. A method of making a belt construction as set forth in claim 18 and including the step of forming the top width of said belt construction to be approximately 1.625 inches.

20. A method of making a belt construction as set forth in claim 12 and including the step of forming at least one of said tension section and said compression section to have reinforcing fiber means therein.

21. A method of making a belt construction as set forth in claim 12 and including the step of disposing at least one layer of fabric means on at least one of said top surface and said bottom surface.

22. A method of making a belt construction as set forth in claim 18 wherein said belt construction is to be utilized for a continuously variable transmission unit such as for a transportation vehicle or the like wherein said belt construction must conform to minimum and maximum diameters of approximately 3 inches and approximately 9 inches respectively and including the step of forming said belt construction with a length selected from a range of approximately 30 inches to approximately 65 inches.

* * * * *